US005087925A

United States Patent [19]

No et al.

[11] Patent Number: 5,087,925

[45] Date of Patent: Feb. 11, 1992

[54] SMALL DIAMETER DRUM THERMAL PRINTER USING EDGE DETECTOR

[75] Inventors: Young No, Pittsford; Stanley W. Stephenson, Spencerport, both of N.Y.

[73] Assignee: Eastman Kodak Company, Rochester, N.Y.

[21] Appl. No.: 591,205

[22] Filed: Oct. 1, 1990

[51] Int. Cl.[5] .............................................. G01D 15/10

[52] U.S. Cl. ............................... 346/76 PH; 400/708; 346/103

[58] Field of Search .................. 346/76 PH, 103, 134, 346/138; 400/120 MP, 708; 101/409

[56] References Cited

U.S. PATENT DOCUMENTS

| | | | |
|---|---|---|---|
| 4,667,208 | 5/1987 | Shiraki et al. | 346/76 PH |
| 4,728,966 | 3/1988 | Piatt et al. | 346/76 PH |
| 4,755,834 | 7/1988 | Kunimitsu et al. | 346/76 PH |

*Primary Examiner*—Benjamin R. Fuller
*Assistant Examiner*—N. Le
*Attorney, Agent, or Firm*—Raymond L. Owens

[57] ABSTRACT

In a thermal printer having a small diameter drum, a sensor having an emitter and detector detects the lead edge of a receiver sheet just prior to its entry into the nip between the drum and a print head.

6 Claims, 2 Drawing Sheets

SMALL DIAMETER DRUM THERMAL PRINTER USING EDGE DETECTOR

FIELD OF THE INVENTION

The present invention relates to thermal printers and, more particularly, to edge detector apparatus for color registration of an image on a dye receiving sheet being moved by a small diameter drum.

BACKGROUND OF THE INVENTION

In a typical thermal printer, a web-type dye-carrier containing a series of spaced frames of different colored heat transferrable dye is spooled onto a carrier supply spool. The carrier is paid out from the supply spool and rewound on a take-up spool. The carrier moves through a nip formed between a thermal print head and a dye-absorbing receiver sheet. In one particular arrangement, the receiver sheet is clamped to a rotatable drum. The receiver sheet may, for example, be coated paper and the print head is formed of a plurality of heating elements. When heat is selectively applied from the heating elements to the dye-carrier, dye is transferred to the receiver sheet. As shown in commonly assigned U.S. Pat. No. 4,815,870, at the beginning of a print cycle, the receiver sheet is clamped to the drum. After being clamped to the drum, the receiver is advanced under the print head. The heating elements of the print head are energized to form a dye image. The drum makes several revolutions as different colored dye images are applied into the receiver. In this way, a final, full-colored image is produced. After this full-colored image is produced, the direction of the drum is reversed, and when a position is reached the clamp is opened and the receiver sheet is ejected from the thermal printer.

In certain printers, particularly in those where the image is of great length, it is preferable to use a small diameter drum which as used herein means the drum diameter is selected so that its circumference is less than the length of the receiver. In cases where the image is, for instance, an A size image (8.5 inches by 11 inches), a corresponding drum would be over 3.5 inches in diameter. Such a print drum represents significant costs and volume in design of a printer. In addition, such a drum increases the load and precision requirements on the drive system. The reach at the head (distance between the nip and the position where the head is pivotably mounted) also increases when large drums are used. This length increases the cost of the head. The reduced size of the head in small drum printers represents a significant cost savings. In these small drum printers, the platen may complete several rotations before a color plane is deposited. After the dye plane is deposited, it is necessary to re-position the paper so that the first line of the image is back under the thermal head.

In most of these small drum printers, the drum is rotated in a first direction as a colored dye image is printed in the receiver. After this image is printed, the direction of the drum is reversed and the sheet is returned to the start position. Successive dye layers are deposited until a complete image is formed. Drums used in these printers are covered with an elastomeric surface for two reasons; to provide media compliance to the thermal head, and to provide a high friction surface between the receiver and drum so as to allow for accurate metering of the receiver during printing. Because this surface is an elastomer, there is a low resistance to material flow and twist both during printing and rewind. Depending on the properties of the receiver and elastomer, typical registration in certain printers will be about 0.010", worse case. This misregistration is also affected by the type of image printed, and even environmental and aging factors.

SUMMARY OF THE INVENTION

Accordingly, it is an object of the present invention to eliminate the misregistration problem found in prior art small diameter drum thermal printers.

This object is achieved in a color thermal printer apparatus in which colored dye is sequentially transferred from colored dye frames in a dye-carrier into a receiver by heat applied from an energized print head which forms a nip by pressing the carrier and receiver against a small diameter drum, the receiver advancing from a start position into the nip means for incrementally rotating the print drum to advance the receiver until a colored dye frame is printed and then rotating the drum in a counter direction to a position where the receiver is spaced from the nip and ready to be fed again into the nip, the improvement comprising:

(a) a rotatable drum having a platen surface;

(b) sensor means disposed adjacent to the nip for detecting the lead edge of that portion of the receiver and producing a signal when recognizing the lead edge just prior to the sheet entering the nip; and (c) means responsive to such signal for controlling the energization of the print head as the drum rotates in the first direction to form a colored dye frame in the receiver.

A feature of the present invention is that the sensor can be positioned close to the nip to reduce misregistration.

By using two sensors, one on each side edge of the receiver, receiver skew can be measured and minimized.

MODES OF CARRYING OUT THE INVENTION

Figure 1:
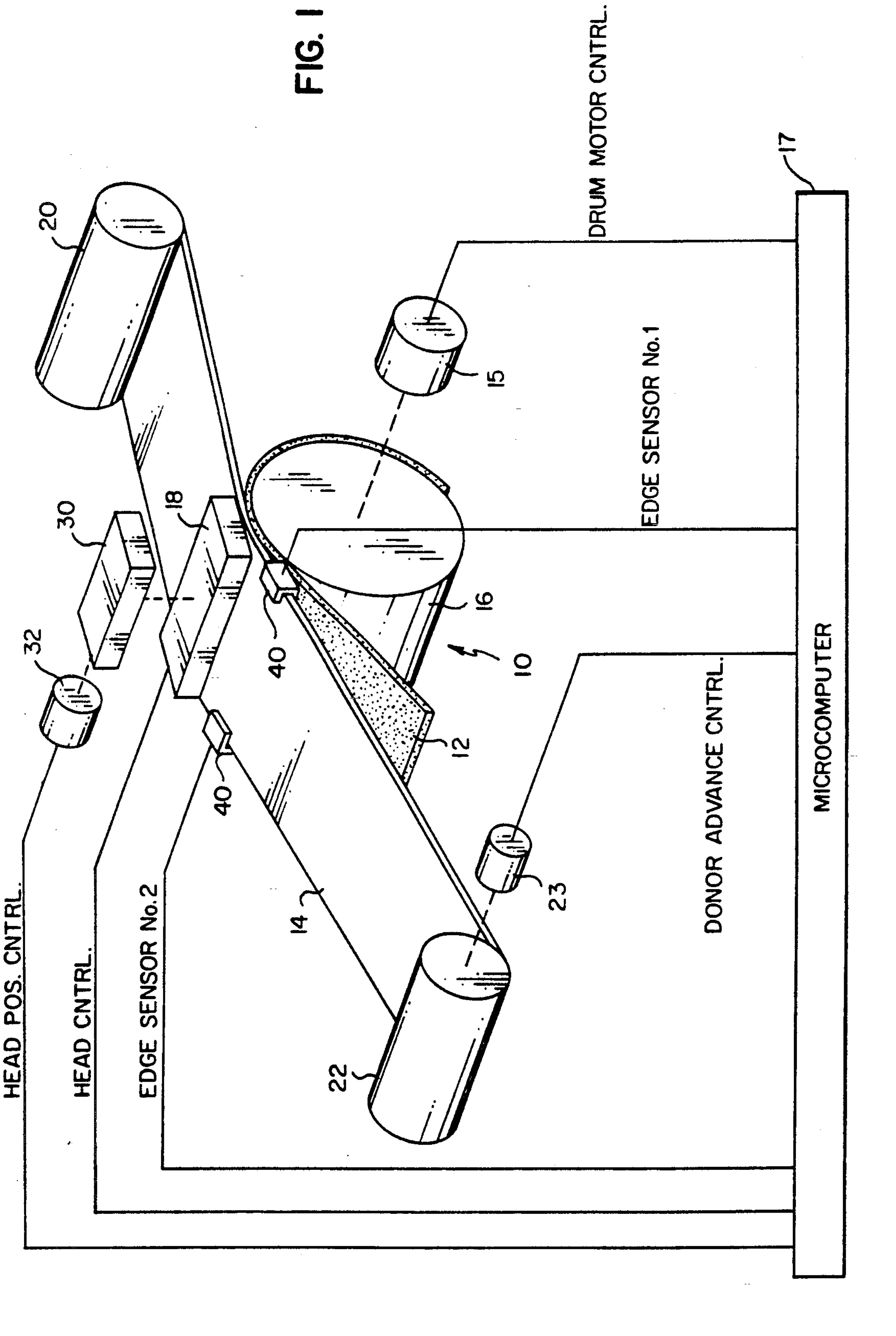
FIG. 1 is a schematic of a thermal printer apparatus which can be used to make colored images in a receiver.

Turning first to FIG. 1, there is shown a thermal printer apparatus 10 which uses a dye-carrier 14 and a receiver sheet 12. The receiver 12 is incrementally advanced a step at a time by a motor-sheet drive (15) through the nip formed between a print head 18 and a small rotatable drum 16. The rotatable drum 16 can be incrementally moved in two separate directions. It will be understood that when the drive mechanism 15 advances the drum in the clockwise or first direction, dye from the carrier is transferred a line at a time into the receiver sheet at the nip position. The print head 18 presses the carrier 14 against the receiver sheet, which is mounted on the platen surface of the rotatable drum 16. The platen surface of the drum 16 is formed by an elastomeric drum covering. Microcomputer 17 controls the operation of the mechanism 15. The thermal print head 18 presses the dye-carrier 14 and the receiver sheet against the platen surface of the drum 16. The carrier 14 is driven along a path from a supply or payout roller 20 onto a take-up roller 22 by a drive mechanism including a stepper motor 23 coupled to the take-up roller 22. Microcomputer 17 also controls the drive mechanism 23. Heating elements of the print head 18 are selectively energized by a drive circuit (not shown) which is also controlled by the microcomputer 17 to produce heat which causes dye to transfer. A conventional head lift mechanism 30 is coupled to the print head 18. Under the control of the microcomputer 17, when a motor 32 rotates in a first direction, mechanism 30 lifts the print head away form the nip. When the motor 32 is rotated in the opposite direction, the print head again forms the nip with the drum 16.

It will be understood to those skilled in the art that the dye-carrier member 14 is formed with a repeating series of thermally transferrable dye frames. Each series includes a frame of yellow, magenta or cyan dye. A single series is used to print one colored print in the receiver sheet member. In this way the drum 16 must advance the receiver sheet 12 past the print head 18 three separate times to form a full colored image. The first time a yellow dye frame is formed, the second time a magenta dye frame is formed superimposed on yellow dye frame, and the third time a cyan dye frame is formed superimposed on the first two colored dye frames to complete the full color image in the receiver.

Figure 2:
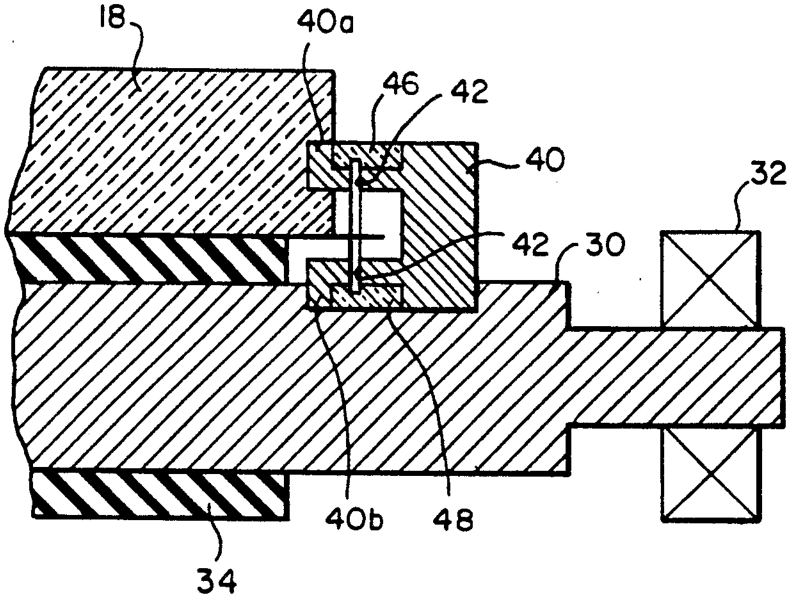
FIG. 2 is a partial cross-sectional view showing the sensor means relative to the print head in the drum.
Figure 3:
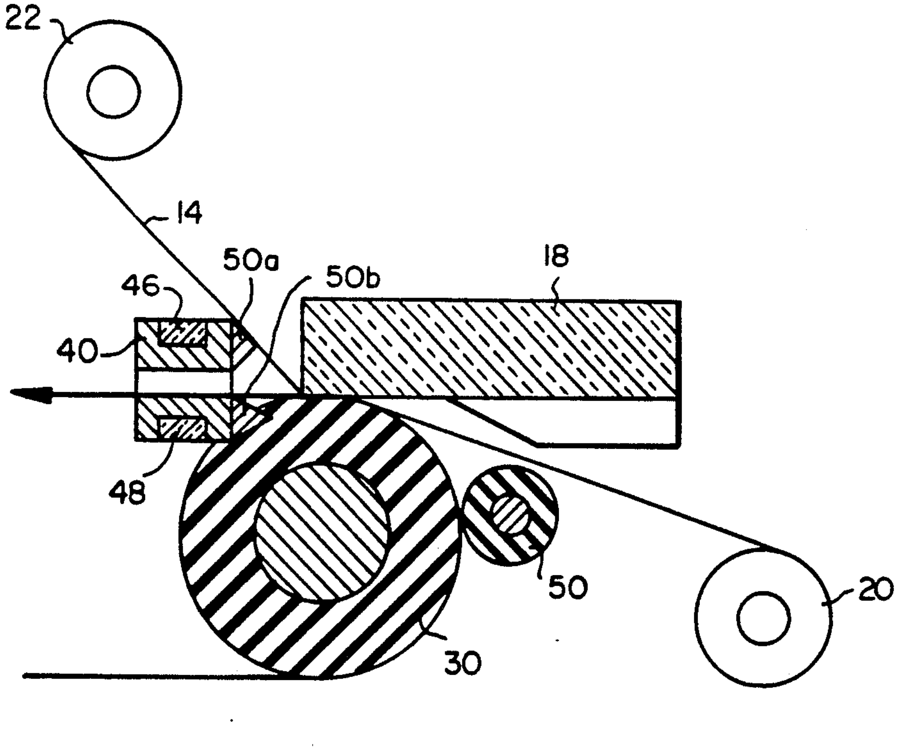
FIG. 3 is a side view of the arrangement shown in FIG. 2.

As shown in FIGS. 2 and 3, the drum 16 includes a rotatable metal drum shaft 30 mounted in bearings 32. The drum is provided with an elastomeric cover 34 secured about the shaft 30. The outer surface of the cover 34 provides a platen surface which cooperates with the print head 18 to provide a nip.

As shown in FIG. 1, there are two sensor devices 40. Each sensor device 40 is disposed adjacent to the nip and a side edge of the receiver 12. The sensor 40 includes a bifurcated monolithic body fixedly secured to a frame, not shown, and has two oppositely spaced portions 40*a* and 40*b*. Each of the sensors 40 are positioned adjacent to the nip. A receiver sheet overhangs the platen at both ends of the platen surface of the drum and is positioned between the bifurcated portions. The top and bottom portions are each provided with aligned light conducting slots 42. An LED 46 (light emitter) mounted in portion 40*a*, produces light which is projected through the slot 42 and picked up by a detector 48 mounted in portion 40*b*. Light to detector 48 is interrupted and detected by the detector 48 to detect the leading edge of the receiver sheet 12 and to signal the microcomputer 17 to begin printing. At such an event, a signal is provided to the microcomputer 17 indicating that the lead edge is about to enter the nip. The detector also has light interrupted when the direction of rotation of drum 16 is reversed and the trailing edge of a receiver sheet interrupts light from the emitter to the detector. As shown in FIG. 3. The body is formed with top and bottom guiding details 50*a* and 50*b* which direct the receiver sheet 12 into the space between the top and bottom portions 40*a* and 40*b*, respectively. This prevents the receiver sheet from buckling.

LED 46 is preferably provided with a molded optic allowing only a fine beam in an axis orthogonal to the emitters body. In one embodiment, the LED was an OPTEK OP240A infrared emitter, with a minimum aperture radiant incidence of 0.6 mW/cm2. The portions 40*a* and 40*b* were provided with a 0.005" slit created by laser machining. The two halves of the body are laser machined simultaneously so that the slit was colinear. The body is preferably made of a material that provides a debris-free slit, such as DuPonts DELRIN. The sensor element should contain a high-sensitivity detection element and thresholding and conditioning electronics, such as the OPTEK OPL560C.

In operation, the receiver 12 advances until the lead edge is detected by the sensors. In one embodiment, the drive system was a stepper-gear motor designed so as to advance the receiver into the sensor 40 in increments smaller than the resolution of the slit sensor. In tests, we have found that, with this embodiment, the slit sensor can resolve receiver position to 0.0005". The stepper motor and accompanying gear train provided an angular advancement of the drum for advancing the receiver such that the receiver advances a distance less than or equal to the 0.0005" resolution. After the lead edge is detected, the motion of the drum for advancing the receiver is shut off. The microcomputer, in response to a signal from sensor 40, causes motor 32 to cause mechanism 30 to lower the head and sandwich the lead edge of the receiver sheet 12 in the nip. Motor 15 is now incrementally advanced a line at a time and the print head 18 is energized by the microprocessor to create a dye image in the receiver 12. The carrier 14 is also advanced as motor 23 is driven by the microcomputer 17.

At the end of the first color patch, the head 18 is lifted and the drum motor 15 energized in the reverse position until the sensors 40 detects that the starting edge of the receiver has cleared the sensors. The motor 15 is then stepped in the printing direction until the sensor is blocked. The receiver is now moved in a reverse direction until the receiver front edge clears the sensors 40. Using this technique, the geartrain backlash cannot affect color registration. The rewind and print cycle is repeated until the complete image is formed.

To aid in the rewind cycle, the receiver 12 should be held against the drum 16 to reduce the total amount of slip and reduce skewing error. This is done by the use of one or more contact rollers 50 disposed around the perimeter of the drum. See FIG. 3.

If one sensor is used, the front to back alignment is perfect on one side, but any skewing of the paper induced by printing rewind will create a worse case error on the side of the paper opposite to the sensor. By placing sensors on both sides of the paper, the skew can be measured in counts of the drum drive motor for each color separation. The microcomputer then uses the change in the skew measured from the skew measured at the start of printing to control the energization of the print head heating elements to center the skew error in the middle of the image. In this way, the worse case skew error will be halved.

In the preferred embodiment, during the first color patch the receiver is advanced into both sensors simultaneously, and the number of motor steps between the two triggerings is stored as a baseline skew measurement Y—Y'. Then the drive system is advanced a short number of steps that covers the worse case induced skew. On the second pass, receiver skew is re-measured and if the skew has changed, the additional steps are modified so that the induced skew is centered in the middle of the image. In this manner, worse case skew misregistration will be (skew.error)/2".

The invention has been described in detail with particular reference to a certain preferred embodiment thereof, but it will be understood that variations and modifications can be effected within the spirit and scope of the invention.

We claim:

1. In a small diameter drum color thermal printer apparatus in which colored dye is sequentially transferred from colored dye frames in a dye-carrier into a receiver having a leading and trailing edge by heat applied from an energized print head which forms a nip by pressing the carrier and the receiver against a small diameter drum, the receiving means for incrementally rotating said small diameter drum in a first direction to advance the receiver until a colored dye frame is printed and then rotating said drum being rotated in a counter direction to a position where said receiver is spaced from the nip and ready to be fed again into the nip, the improvement comprising:

(a) said small diameter drum having a platen surface wherein the drum is configured so that both side edges of the receiver when in the nip hangs over one end of such platen surface;

(b) sensor means disposed adjacent to the nip for detecting the lead edge of a portion of the receiver which overhangs one end of the platen surface when in the nip and produces a signal just prior to said receiver entering the nip; and (c) means responsive to such signals for controlling the energization of the print head as the drum rotates in the first direction to form a colored dye frame in the receiver.

2. The small diameter drum color thermal printer as set forth in claim 1 wherein the sensor means includes an emitter/detector device positioned to detect the receiver lead edge.

3. The small diameter drum color thermal printer as set forth in claim 2 wherein said emitted/detector device includes a bifurcated monolithic body having oppositely spaced portions with each portion having an aligned light conducting slot and emitter and detectors being mounted in such opposite portions, wherein the emitter is a source of light which projects light through conducting slots where it is detected by a light detector so as to detect the leading edge of a receiver sheet.

4. In a small diameter drum color thermal printer apparatus in which colored dye is sequentially transferred from colored dye frames in a dye-carrier into a receiver having a leading and trailing edge by heat applied from an energized print head which forms a nip by pressing the carrier and the receiver against a small diameter drum, the receiver advancing from a start position into the nip, means for incrementally rotating said small diameter drum in a first direction to advance the receiver until a colored dye frame is printed and then rotating said drum being rotated in a counter direction to a position where said receiver is spaced from the nip and ready to be fed again into the nip, the improvement comprising:

(a) said small diameter drum having a platen with a surface defining ends wherein the drum is configured so that both side edges of the receiver hang over the ends of such platen surface;

(b) spaced first and second sensor means disposed on opposite side edges of the receiver adjacent to the nip, each sensor means being adapted to detect the lead edge of a portion of the receiver which overhangs one end of the platen surface when in the nip and produces a signal just prior to said receiver entering the nip; and (c) means responsive to such signals for controlling the energization of the print head as the drum rotates in the first direction to form a colored dye frame in the receiver.

5. The small diameter drum color thermal printer as set forth in claim 4 wherein each sensor means includes an emitter/detector device positioned to detect the receiver lead edge.

6. The small diameter drum color thermal printer as set forth in claim 5 wherein each said emitted/detector device includes a bifurcated monolithic body having oppositely spaced portions and each portion having an aligned light conducting slot and emitter and detectors being mounted in such opposite portions wherein the emitter is a source of light through conducting slots where it is detected by a detector so as to sense the leading edge of a receiver sheet.

* * * * *